United States Patent
Monnerat

(10) Patent No.: US 7,403,155 B2
(45) Date of Patent: Jul. 22, 2008

(54) METHOD FOR THE ACCELERATED ACQUISITION OF SATELLITE SIGNALS

(75) Inventor: Michel Monnerat, L'Union (FR)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 11/617,067

(22) Filed: Dec. 28, 2006

(65) Prior Publication Data

US 2007/0194985 A1    Aug. 23, 2007

(30) Foreign Application Priority Data

Dec. 29, 2005  (EP)  ................... 05301123

(51) Int. Cl.
*G01S 1/00* (2006.01)
(52) U.S. Cl. .............. 342/357.15; 342/357.1
(58) Field of Classification Search ..............
342/357.01–357.17
See application file for complete search history.

(56) References Cited

U.S. PATENT DOCUMENTS

| 5,848,373 | A  | * | 12/1998 | DeLorme et al. ........... 701/200 |
| 6,313,786 | B1 |   | 11/2001 | Sheynblat |
| 2003/0083816 | A1 |   | 5/2003 | Imakado |
| 2003/0100316 | A1 | * | 5/2003 | Odamura .................. 455/456 |
| 2004/0162084 | A1 |   | 8/2004 | Wang |
| 2005/0068299 | A1 |   | 3/2005 | Moilanen |
| 2005/0164712 | A1 | * | 7/2005 | Kennedy et al. .......... 455/456.1 |
| 2006/0181453 | A1 | * | 8/2006 | King et al. ............. 342/357.06 |
| 2006/0238418 | A1 | * | 10/2006 | Monnerat et al. ....... 342/357.09 |

* cited by examiner

*Primary Examiner*—Thomas H. Tarcza
*Assistant Examiner*—Nga X Nguyen
(74) *Attorney, Agent, or Firm*—Sughrue Mion, PLLC

(57) ABSTRACT

The present invention proposes to use optimally a location method based on a WIFI type short-range telecommunication system and a satellite location system. The short-range telecommunication system is used to locate the terminal accurately within the building in which it is situated. The method uses a cartographic representation of the buildings in order to deduce from the position of the terminal a set of satellites that could be received by the terminal. The satellites are then acquired to synchronize the terminal to the satellite system. That synchronization is then used when the terminal leaves the building to acquire as quickly as possible the set of satellites of the satellite navigation constellation.

5 Claims, 3 Drawing Sheets

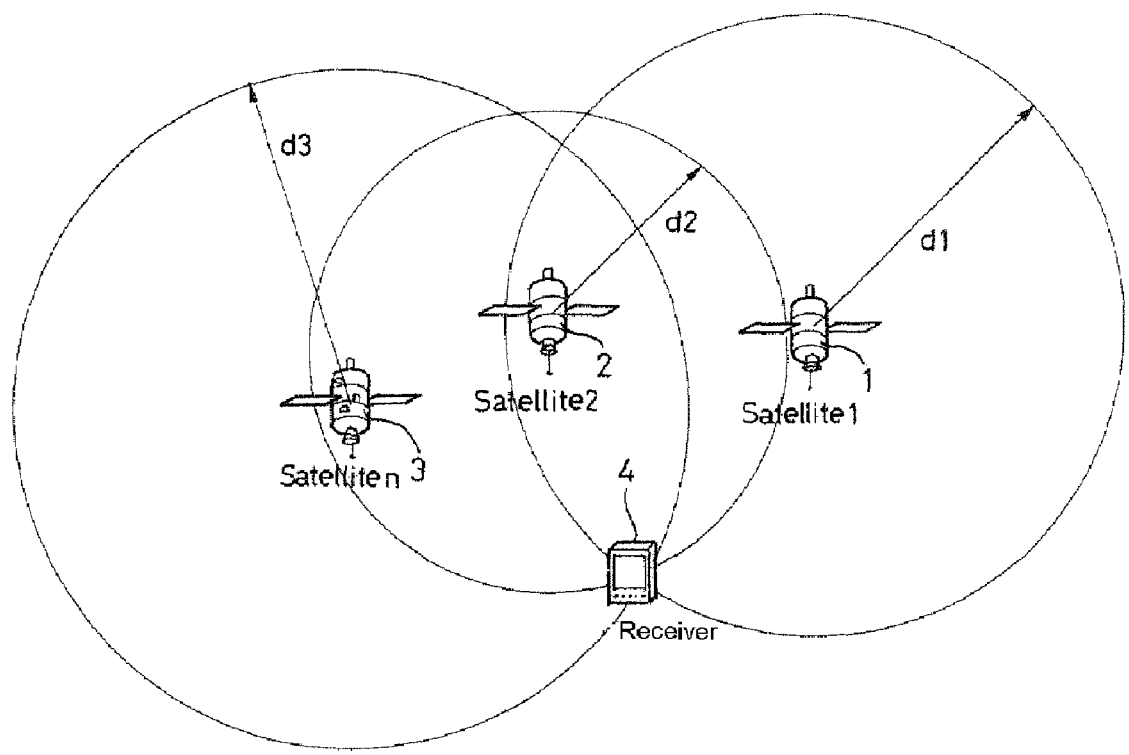

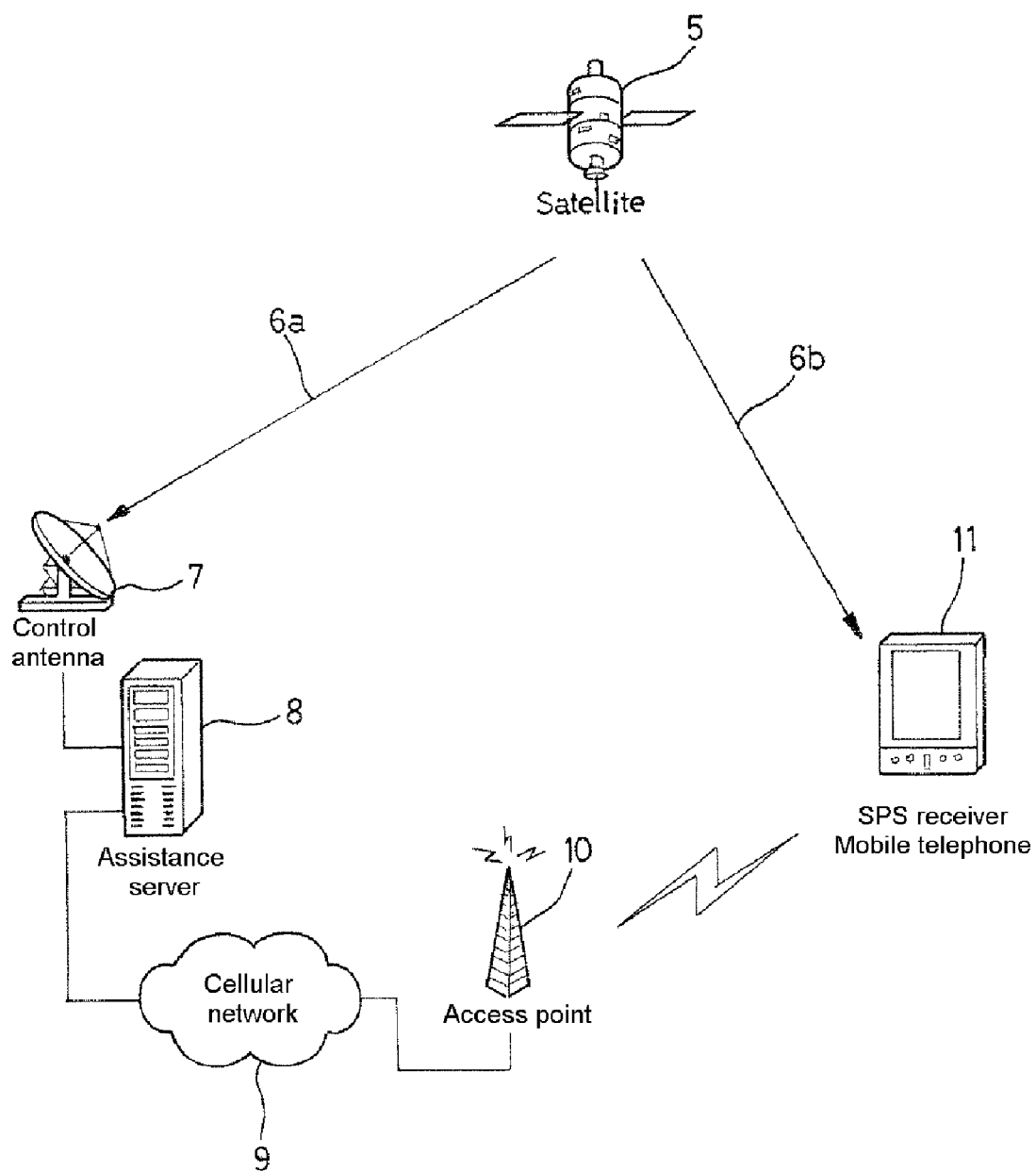

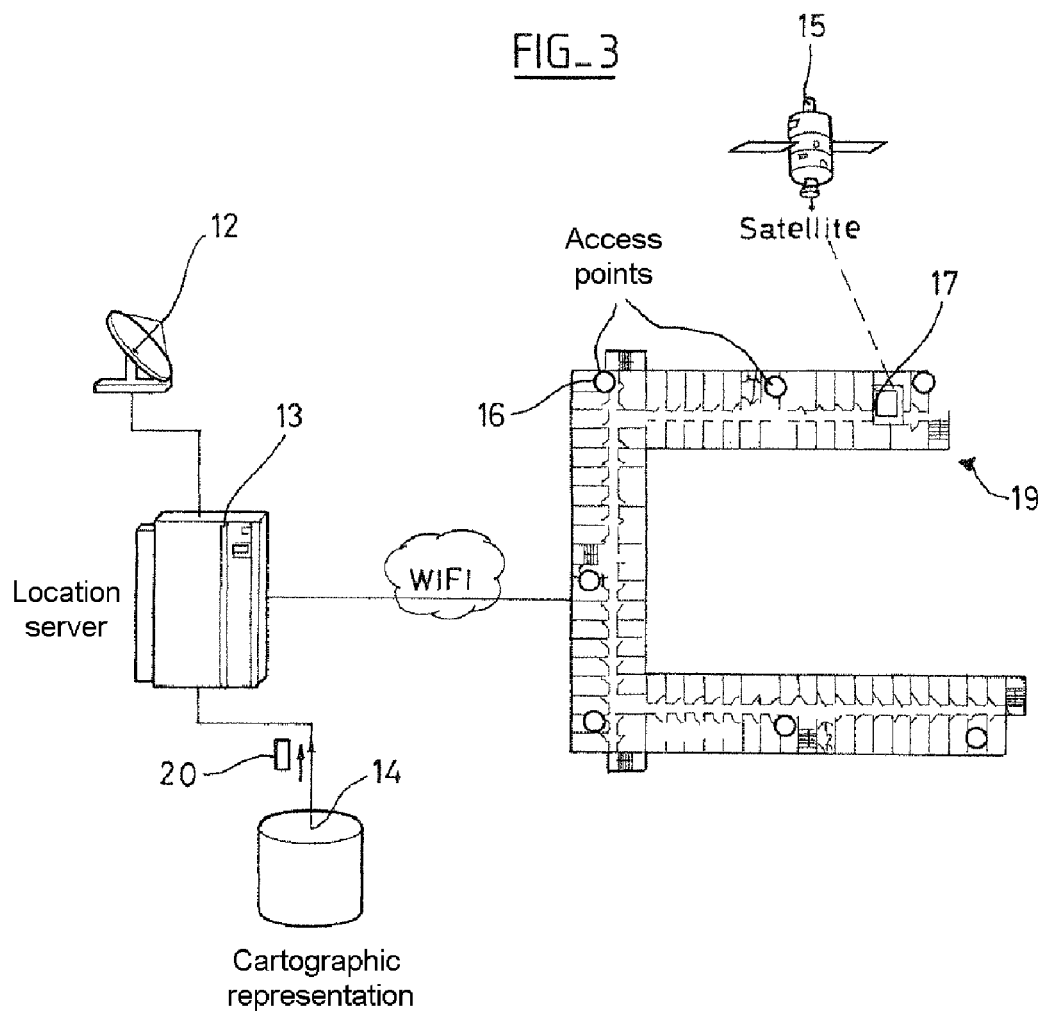
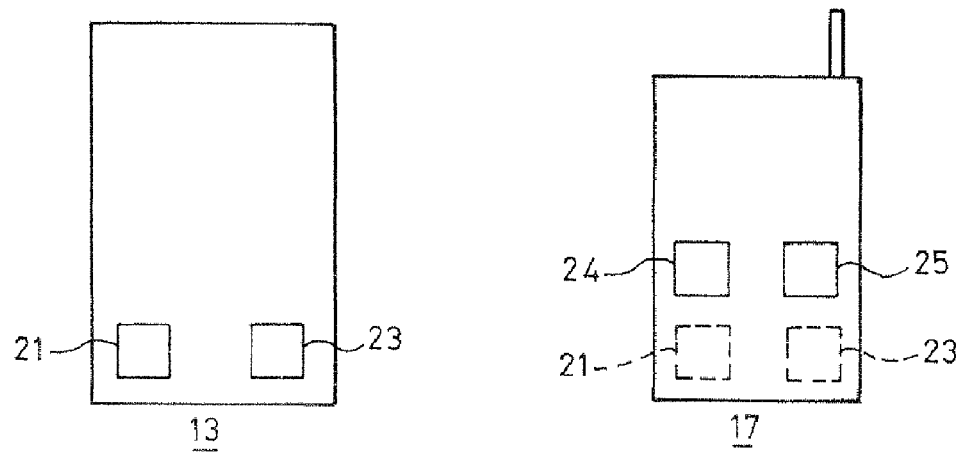

METHOD FOR THE ACCELERATED ACQUISITION OF SATELLITE SIGNALS

CROSS-REFERENCE TO RELATED APPLICATIONS

This application is based on French Patent Application No. 05301123.5 filed Dec. 29, 2005, the disclosure of which is hereby incorporated by reference thereto in its entirety, and the priority of which is hereby claimed under 35 U.S.C. §119.

BACKGROUND OF THE INVENTION

1. Field of the Invention

The present invention relates to a method for the accelerated acquisition of positioning satellite signals from a satellite location system for a mobile terminal moving from the interior to the exterior of a building, this method optimally combining a local telecommunication system inside the building and the satellite location system. A local telecommunication system means a wireless telecommunication local area network such as the Wireless Fidelity (WIFI) network conforming to the IEEE 802.11 standard, a system utilizing the Ultra Wide Band (UWB) local area network radio technology, or a system capable of operating under the short-range communication protocol known as Bluetooth. Satellite location system means a satellite positioning system of GPS (Global Positioning System), Galileo or Glonass type.

2. Description of the Prior Art

The invention also relates to a hybrid location system for the accelerated acquisition of positioning satellite signals for this kind of mobile terminal.

In a satellite positioning system utilizing GNSS (Global Navigation Satellite System) type receivers such as a GPS or Galileo receiver, the data signals enabling the receiver to calculate its position come from different satellites (at least four to determine the four unknowns x, y, z and t). It is well known by the man skilled in the art that positioning by such a system presupposes two types of processing in the receiver.

The first consists in acquiring the signal coming from at least four satellites, the second consists in evaluating the distance separating the receiver from the satellites from which the signal has been received. The interface between a Radio Navigation Satellite System (RNSS) and the user receiver relies on a radio signal itself relying on a spread spectrum technique well known to the man skilled in the art. Spread spectrum techniques, in their most routine form such as the C/A code GPS, F/Nav Galileo, rely on the use of a periodic pseudo-random code. In the context of the GPS, that code has a period of 1 millisecond (ms). This code is added to a digital navigation message, that message including a certain number of items of information necessary for the calculation of the position of the receiver, typically:

- a time reference, well known in GPS under the name TOW (Time of Week) corresponding to the time of sending of the message,
- the position of the satellite at the time of the sending of the message, well known in GPS under the name ephemerides,
- certain corrections to be made to the onboard clock of the satellite, well known in GPS under the name clock corrections, aiming to correct the time reference relative to the global clock of the system,
- certain propagation correction parameters, such as parameters for correction of the propagation speed of electromagnetic waves in the layers of the atmosphere (in particular the ionosphere),
- the approximate position of the other satellites of the constellation via data known as almanacs.

The data bit rate is of course lower than the periodic spreading code bit rate. In the GPS SPS (GPS Satellite Positioning System) signal, the data bit rate typically rises to 50 bits per second, whereas that of the code is 1.023 million chips per second. A complete code being constituted of 1023 chips (i.e. 1 ms). All of the data added modulo 2 to the spreading code is transmitted on a carrier. In GPS, the carrier is typically at 1.57542 GHz.

The determination of the position of the receiver is represented in FIG. 1. The principle consists in a receiver [4] determining the distance separating it from at least three satellites of the constellation referenced by satellites [1], [2] and [3] (three satellites for location in two dimensions and four satellites for location in three dimensions). Once these distances [d1], [d2] and [d3] have been determined, the receiver can determine its position at the intersection of the spheres whose center is the position of each of the satellites themselves and whose radius is given by the distance [di]. The distance measurement is effected by measuring the time of arrival of a radio signal coming from the satellite. It follows that the essential information coming from the satellite via the navigation message that the receiver must process consists of the pair (sending TOW, position of the satellite at the time of sending). The satellite transmits in its navigation message its ephemerides (Keplerian parameters) enabling the receiver to calculate the position of the satellite in a frame of reference linked to the Earth. In the GPS case the ephemerides consist of 16 parameters.

| | |
|---|---|
| M0 | Mean anomaly |
| Dn | Mean displacement |
| E | Eccentricity |
| $(A)^{1/2}$ | Root of half major axis |
| OMEGA 0 | Longitude of ascending node |
| I0 | Inclination |
| W | Argument of perigee |
| OMEGA DOT | Time derivative of right ascension |
| I DOT | Time derivative of inclination |
| Cuc | Cosine amplitude of harmonic of latitude argument correction term |
| Cus | Sine amplitude of harmonic of latitude argument correction term |
| Crc | Cosine amplitude of harmonic of orbit radius correction term |
| Crs | Sine amplitude of harmonic of orbit radius correction term |
| Cic | Cosine amplitude of harmonic of Inclination angle correction term |
| Cis | Sine amplitude of harmonic of Inclination angle correction term |

These parameters are repeated every 30 seconds in the navigation message.

The position of the satellite being obtained, it remains for the receiver to detect the time of sending of the message in order to deduce the propagation time of the wave and then the distance separating it from the satellite, and thus the radius of one of the three necessary spheres. As indicated hereinabove, the time also forms part of the content of the navigation message broadcast by the satellite. That time is repeated every 6 seconds. However, it is necessary to apply a satellite clock correction to the time read in the navigation message in order to transpose the transmitted time into a system reference common to all the satellites. This correction is transmitted every 30 seconds.

In conclusion, it is clearly apparent that a receiver can be in a position to determine its position only at the end of a minimum time of 30 seconds after having acquired the signal. The acquisition of the signal means the whole of the first operation to be effected by the receiver, which enables it to be synchronized in frequency and in time to the bit streams transmitted, an essential phase for the demodulation of the navigation message. For the receiver, acquisition consists in effecting a time-frequency search of the energy of the signal coming from the satellite. Locking onto the frequency of the signal from the satellite consists for the receiver in being tuned to the frequency at which the signal from the satellite is received. The receiver has three uncertainties leading it to effect this search:

Doppler effect linked to the mobility of the satellite,

Doppler effect linked to the mobility of the user, uncertainty linked to the accuracy of the receiver clock.

For the receiver, time locking consists in identifying a code transition in the received signal. The spreading code in the case of the GPS being periodic with a period of 1 ms, the time search is effected with a 1 ms horizon. Once the code transition has been identified, the man skilled in the art knows how to identify a bit transition and then the frame synchronization broadcast in the navigation message.

This time-frequency search is very costly in terms of receiver complexity and limits commensurately the performance of the receiver.

To summarize, the time taken by a receiver to provide a first position is constrained by a very costly first phase of seeking time-frequency synchronization and also by the reading of basic information in the navigation signal (greater than 30 s).

The method known to the man skilled in the art for alleviating this problem is known as Assisted GPS or Assisted GNSS. This method consists in coupling a cellular telecommunication system and a satellite navigation signal receiver. This method is described in FIG. 2. It assumes that the satellite navigation signal receiver is coupled to a cellular telecommunication receiver (terminal) [11]. A network equipment commonly called the assistance data server [8] listens continuously to the satellites of the satellite constellation via a radio signal [6a] and a control antenna referenced [7]. The information from the navigation message from each satellite is then stored by the server [8]. When the receiver [11] is searching for its position, it requests a certain number of items of assistance data by means of a call via a base station [10] of the cellular network [9] to the assistance data server. The assistance data is then returned by the server [8] to the receiver [11] via the base station [10]. This assistance data facilitates the processing of the signal [6b] received by the receiver [11] coming from the satellite [5] and confers on the receiver performance that is enhanced, inter alia, in terms of calculation time. In fact, the assistance data may be of the following type:

Content of the navigation message broadcast in the signals [6b] and [6a]. The content is returned at a bit rate much higher than the bit rate of the navigation message. The time taken to route the data essential to the determination of the position is therefore changed from 30 seconds to 1 to 2 seconds.

Pre-location of the receiver [11]. In fact, the receiver [11] being connected to the base station [10], the server [8] is in a position to know that the receiver is in the vicinity of the base station [10]. In a GSM type network, the dimension of the cells is typically less than 35 km.

A time reference. The server [8] receiving the data from the satellite [5] is in a position to know the satellite system time and therefore to broadcast it to the receiver [11]. Most cellular communication networks being asynchronous, the time reference transmitted can achieve an accuracy only of the order of 2 to 3 seconds.

Different types of corrections: propagation speed corrections, satellite onboard clock correction, local propagation correction, etc.

The knowledge of a pre-location, of the ephemerides of the satellites and of an approximate time reference enables the receiver to calculate the Doppler effect of the satellites in view, greatly reducing the uncertainty in terms of frequency to be swept during the acquisition phase. Similarly, the ephemerides of the satellites being known via the call to the server [8], it becomes unnecessary for the receiver [11] to demodulate this data in the navigation message [6b], which eliminates the constraint of 30 seconds previously highlighted for calculating the position. It then suffices for the receiver to determine a time event in the signal [6b] from the satellite, in other words to find the spreading code transition and then the transmitted time, the TOW in the GPS signal which recurs every 6 seconds. There is therefore clearly a significant improvement in performance, as much with regard to the time necessary for the calculation of a location point as with regard to the sensitivity. Sensitivity means the minimum power of the signal received by the receiver enabling it to perform adequate processing.

The assistance example is provided in a GSM type cellular network, it goes without saying that it may be extended to other systems such as WIFI, WIMAX type systems.

However, even used in an assistance mode as referred to hereinabove, satellite location systems suffer from a limitation linked to the environment of the receiver and more particularly linked to the radio attenuation of the materials surrounding the receiver. These limitations are particularly revealed inside buildings.

The Research & Development teams of the Applicant are the first to have considered, for the interior spaces of buildings, triangulation techniques based on communication systems such as WIFI, WIMAX or UWB. The technology in widest use at the present time is, furthermore, based on triangulation using WIFI signals. This triangulation is effected by the receiver, which measures the distance separating it from various access points. The distance measurement may be established by a power measurement, for example. This measurement of the power received from a given access point enables a distance to be deduced by comparison with a model of attenuation as a function of distance. An alternative approach relies on measuring the time of arrival, in all respects identical to the method employed in satellite location systems. It is to be noted that systems, well known to the person skilled in the art, rely on a calibration of the radio environment, enabling the association with each position in a building of a characterization of the powers received from each access point visible from that position. A receiver measuring a configuration of powers received from all the access points surrounding it can determine its position thanks to this prior calibration. This technique is well known under the name of "Finger Printing".

The limitations of these latter systems are many: on the one hand, they necessitate a large number of access points in a building, but they also no longer function immediately the receiver leaves the building, outside which the WIFI access points are no longer visible from the terminal.

The Research & Development teams of the Applicant therefore considered coupling a WIFI, WIMAX or UWB receiver to an SPS (Satellite Positioning System) receiver of the GPS or Assisted GPS type. This coupling enables location inside the building but also outside. Nevertheless, the coupling does not enable an optimum continuity of service and, in many environments, offers less than optimum location performance. In fact, at the time of the transition from the interior of the building to the exterior of the building, the changeover from location based on local communication signals (WIFI, WIMAX, UMB) to location based on satellite signals is affected with a latency linked to the acquisition of the satellite signals, as previously explained. This latency is at least 30 seconds, as demonstrated hereinafter. It leads to an interruption in the continuity of the location service.

SUMMARY OF THE INVENTION

An object of the present invention is to solve the problems cited above and the present invention aims to provide a method for optimum coupling between a short-range location system, such as a local telecommunication system based on a local area network conforming to the IEEE 802.11 standard, and an SPS (Satellite Positioning System).

The invention is novel in that it relies in particular on the astute use of the cartographic representation of buildings to improve the coupling between location inside buildings and processing of satellite signals.

To this end, the invention provides a method of accelerated acquisition of positioning satellite signals from a satellite location system for a mobile terminal moving from the interior to the exterior of a building, the mobile terminal coupling a transceiver capable of exchanging signals of a local range telecommunication system to a transceiver capable of exchanging positioning satellite signals of the satellite location system, which method includes the following steps:
  a step of determination of the approximate position of the terminal by measuring a parameter of a signal coming from at least one access point of the local range telecommunication system immediately the terminal searching for location information detects such an access point,
  a step of determination of the orientations of the various satellites of the satellite location system capable of being perceived from the determined position of the terminal,
  a step of determination of the probability of acquisition of signals coming from the various satellites, as a function of the azimuth and the elevation of each of said satellites perceived and a radio wave attenuation coefficient for the determined position of the terminal known to a system of graphical representation of buildings and of representation of their internal architecture, the latter system being adapted to associate with each position in a building a distribution of probability of acquisition of a satellite signal coming from a given direction,
  a step of searching for satellite signals coming from said satellites for which the probability of reception exceeds a certain threshold,
  a step of synchronization of the terminal to the satellite signal or signals acquired.

In one embodiment, before the step of determination of the probability of acquisition of signals coming from the various satellites, there is a step of transmission by the cartographic representation system to the terminal of a local map representing the building and its interior architecture in which said terminal is situated.

The invention also provides a hybrid location system for accelerated acquisition of positioning satellite signals for a mobile terminal moving from the interior toward the exterior of a building, the hybrid location system including:
  a local range telecommunication system,
  a satellite location system,
  the mobile terminal coupling a transceiver capable of exchanging local telecommunication signals to a transceiver capable of exchanging positioning satellite signals, which system further includes:
  a system of cartographic representation of buildings and of representation of their interior architecture adapted to associate with each position in a building a distribution of probability of acquisition of a satellite signal coming from a given direction,
  means for determining the position of the terminal by measurement of a parameter of a signal coming from at least one access point of the local range telecommunication system immediately the terminal searching for location information detects such an access point,
  means for determining the orientation of the various satellites of the satellite location system capable of being perceived from the determined position of the terminal.
  means for determining the probability of acquisition of signals coming from the various satellites as a function of the azimuth and the elevation of the various satellites of the satellite location system capable of being perceived from the determined position of the terminal and as a function of a radio wave attenuation coefficient for the determined position of the terminal known to the cartographic representation system,
  means for searching for satellite signals coming from said satellites for which the probability of reception exceeds a certain threshold,
  means for synchronization of the terminal to the satellite signal or signals acquired.

In one embodiment, the system of cartographic representation of buildings and of representation of their interior architecture is integrated into a location server using an Assisted-GPS or Assisted-GNSS location technique.

Other features and advantages of the invention will become more clearly apparent on reading the following description of one particular nonlimiting embodiment of the invention given with reference to the appended drawings.

BRIEF DESCRIPTION OF THE DRAWINGS

FIG. 1, already described, represents the prior art method of determining the position of a receiver using the GPS.

FIG. 2, already described, represents the prior art location method using Assisted GPS or Assisted GNSS.

FIG. 3 represents a location system according to one embodiment of the invention.

FIG. 4 is a diagram representing to a larger scale the location server and the terminal from FIG. 3.

DETAILED DESCRIPTION OF THE PREFERRED EMBODIMENT

The invention relates to a method for accelerated acquisition of satellite signals for a mobile terminal moving towards the exterior of a building. This method is implemented in a hybrid location system including:
  a WIFI, UWB or Bluetooth type local telecommunication system, as explained in the introduction to the present application,
  a satellite location system, for example of GPS or Assisted GPS type, as explained in the introduction to the present application,
  at least one mobile terminal coupling a transceiver capable of exchanging local (WIFI, UWB or Bluetooth) telecommunication signals to a transceiver capable of exchanging GPS or Assisted GPS type satellite signals, a system of cartographic representation of the buildings and of representation of the elements constituting the buildings. This cartographic representation system, among other things, associates with each position in a building a probability distribution for reception of a satellite signal coming from a given direction.

In this system, the method implemented includes the following steps:

a step of determination of the position of terminal using the signals of the local (WIFI) telecommunication system, by one of the methods referred to hereinabove, immediately the terminal searching for location information detects an access point of the local (WIFI) telecommunication system, a step of determination of the orientations of the various satellites of the satellite location system seen from the position of the terminal, a step of determination of the probability of reception of the signals coming from the various satellites as a function of the results supplied by the system of cartographic representation of the building, a step of searching for satellite signals coming from said satellites for which the acquisition probability exceeds a certain threshold, a step of synchronization of the terminal to the acquired satellite signal or signals.

The determination of the orientations of the satellites of a constellation of satellites is effected through the knowledge of the almanacs of the constellation or of the ephemerides of the satellites. It consists in determining the azimuth and the elevation of each satellite. To this end, it is necessary:

1. To determine the position of each satellite, as described in the GPS ICD 200C from the almanacs or the ephemerides.
2. To determine the elevation of each satellite, as follows $$\begin{cases} \alpha = \frac{\pi}{2} - A\cos\left(\frac{\frac{(X_s - X_u)X_u + (Y_s - Y_u)Y_u}{\sqrt{a^2 - X_u^2 - Y_u^2}}}{\frac{(X_u^2 + Y_u^2)[(X_s - X_u)^2 + (Y_s - Y_u)^2]}{\sqrt{(a^2 - X_u^2 - Y_u^2)}}}\right), & \text{if } \phi \geq 0 \\ \alpha = -\frac{\pi}{2} + A\cos\left(\frac{\frac{(X_s - X_u)X_u + (Y_s - Y_u)Y_u}{\sqrt{a^2 - X_u^2 - Y_u^2}}}{\frac{(X_u^2 + Y_u^2)[(X_s - X_u)^2 + (Y_s - Y_u)^2]}{\sqrt{(a^2 - X_u^2 - Y_u^2)}}}\right), & \text{if } \phi < 0 \end{cases}$$

where Xs, Ys, Zs are the coordinates of the satellite concerned in a frame of reference linked to the Earth, and where Xu, Yu, Zu are the coordinates of the terminal determined approximately, for example using the WIFI network, α is the elevation of the satellite concerned and φ is the latitude of the terminal, a=6378137.0 km (half major axis of the Earth), b=6356752.3142 km (half minor axis of Earth).

3. To determine the azimuth of each satellite, as follows using the same notation:

$$n_1 = \frac{1}{\sqrt{\frac{b^2}{a^2}\frac{x_u^2 + y_u^2}{a^2 - (x_u^2 + y_u^2)} + 1}} \frac{b}{a} \frac{x_u}{\sqrt{a^2 - (x_u^2 + y_u^2)}}$$

$$\vec{n}n_2 = \frac{1}{\sqrt{\frac{b^2}{a^2}\frac{x_u^2 + y_u^2}{a^2 - (x_u^2 + y_u^2)} + 1}} \frac{b}{a} \frac{y_u}{\sqrt{a^2 - (x_u^2 + y_u^2)}}, \text{ if } \phi_u > 0,$$

$$n_3 = \frac{1}{\sqrt{\frac{b^2}{a^2}\frac{x_u^2 + y_u^2}{a^2 - (x_u^2 + y_u^2)} + 1}}$$

$$n_1 = \frac{1}{\sqrt{\frac{b^2}{a^2}\frac{x_u^2 + y_u^2}{a^2 - (x_u^2 + y_u^2)} + 1}} \frac{b}{a} \frac{x_u}{\sqrt{a^2 - (x_u^2 + y_u^2)}}$$

$$\vec{n}n_2 = \frac{1}{\sqrt{\frac{b^2}{a^2}\frac{x_u^2 + y_u^2}{a^2 - (x_u^2 + y_u^2)} + 1}} \frac{b}{a} \frac{y_u}{\sqrt{a^2 - (x_u^2 + y_u^2)}}, \text{ else}$$

$$n_3 = \frac{1}{\sqrt{\frac{b^2}{a^2}\frac{x_u^2 + y_u^2}{a^2 - (x_u^2 + y_u^2)} + 1}}$$

Azimuth =

$$\begin{cases} A\cos\left[\frac{(X_s - X_u)v_1 + (Y_s - Y_u)v_2 + (Z_s - Z_u)v_3}{\sqrt{(X_s - X_u)^2 + (Y_s - Y_u)^2 + (Z_s - Z_u)^2}}\right] & \text{if } \begin{array}{l}(X_s - X_u)u_1 + \\ (Y_s - Y_u)u_2 + \\ (Z_s - Z_u)u_3 \geq 0\end{array} \\ 2\pi - A\cos\left[\frac{(X_s - X_u)v_1 + (Y_s - Y_u)v_2 + (Z_s - Z_u)v_3}{\sqrt{(X_s - X_u)^2 + (Y_s - Y_u)^2 + (Z_s - Z_u)^2}}\right] & \text{else} \end{cases}$$

4. Determine in the direction given by the azimuth and the elevation the probability of blocking of the satellite signal using the cartographic representation system.

In one embodiment of the cartographic representation system, there is associated with each element of the cartography of the building a coefficient of attenuation of the radio wave. It then becomes a simple matter, after determining the azimuth-elevation, to determine the punch-through points of the radio signal coming from the satellite and to associate therewith an aggregate attenuation and consequently a probability of blocking.

The accelerated acquisition method according to the invention has a number of advantages. The first advantage consists in being able to select the satellites on which an attempt at acquisition is launched by the terminal. An effect of this is an evident saving in the consumption of energy by the terminal. The major improvement is reflected, however, at the time of the transition from the interior of the building to the exterior, and more precisely at the moment of switching from the WIFI location technology to the GPS. In fact, the system proposed here also enables synchronization of the terminal to the satellite system at lower energy cost for the terminal. When the terminal leaves the local telecommunication signal reception area, location is established by triangulation of satellite signals. However, the receiver being already synchronized to the satellite system, the position being known to within 300 meters because of the previous location established by the WIFI network, the necessity of the phase of acquisition of the satellite signals is removed, and position information can be supplied in the first second after leaving the building.

One use of the method is explained hereinafter with reference to FIG. 3. Depending on the embodiment of the invention, a hybrid system 18 includes a WIFI and Assisted GPS compatible terminal [17]. The terminal effects measurements of the power from the various WIFI access points [16] of a building [19] surrounding the terminal [17] and transmits those measurements to a location server [13]. Using determination means [21] known in the art, the location server [13] determines the approximate position of the terminal [17] and supplies that position to the terminal [17]. The location server [13] also compares the position of the terminal [17] to a cartographic database [14] in order to determine all the satellites [15] potentially visible from the position of the terminal [17]. Alternatively, the processing described above may be retained in the terminal by sending it a local map 20 representing the building and its interior architecture within which the terminal is situated. The terminal is then in a position to deduce its approximate position and the satellites that are visible from its power measurement using its internal determination means 21.

Thereafter, the location server [13] also fulfills the Assisted GPS assistance data server function. It collects the assistance data via its reference antenna [12]. The location server [13] supplies the terminal [17] with the ephemerides of the satellites [15]. It includes means [23] for determining the probability of acquisition of the signals coming from the various satellites, as a function of the azimuth and the elevation of the various satellites of the location system capable of being perceived from the determined position of the terminal, and as a function of a radio wave attenuation coefficient for the determined position of the terminal known to the cartographic representation system.

Alternatively, the server transmits only the ephemerides and the terminal incorporates means [23] for determining the probability of acquisition of the signals coming from the various satellites.

The terminal also includes means 24 for searching for satellite signals coming from said satellites for which the probability of reception exceeds a certain threshold, and means 25 for synchronizing the terminal to the satellite signal or signals acquired.

The terminal [17] thus acquires the satellite [15] in this way and is synchronized to the signal coming from said satellite [15]. Note that the measurements effected on the signal received from the satellite [15] may be used to complement the WIFI measurements in order to determine the position of the terminal.

Of course, the invention is not limited to the embodiment described in the present application but extends to any embodiment covered by the claims.

The invention claimed is:

1. A method of accelerated acquisition ot positioning satellite signals from a satellite location system for a mobile terminal, wherein the mobile terminal moves from the interior to the exterior of a building, and the mobile terminal couples a transceiver capable of exchanging signals of a local range telecommunication system to a transceiver capable of exchanging positioning satellite signals of the satellite location system, the method comprising:
determining an approximate position of the mobile terminal by measuring a parameter of a signal from at least one access point of the local range telecommunication system, wherein the mobile terminal searches for location information and detects the at least one access point,
determining orientations of various satellites within the satellite location system which can be perceived from the determined position of the mobile terminal,
determining a probability of acquisition of signals from the various satellites, as a function of the azimuth and the elevation of each perceived satellite, and as a function of a radio wave attenuation coefficient for the determined position of the mobile terminal known to a system of cartographic representation of buildings and their internal architecture, wherein the system associates with each position within a building a distribution of probability of acquisition of a satellite signal from a given direction,
searching for satellite signals from each perceived satellite for which the probability of reception exceeds a certain threshold, and
synchronizing the mobile terminal to acquired satellite signals.

2. A method according to claim 1, further comprising transmitting by the cartographic representation system a local map representing the building and the interior architecture of the building to the mobile terminal before the determining of the probability of acquisition of signals from the various satellites.

3. A hybrid location system for accelerated acquisition of positioning satellite signals for a mobile terminals, wherein the mobile terminal moves from the interior to the exterior of a building, the hybrid location system comprising:
a local range telecommunication system,
a satellite location system,
the mobile terminal which couples a transceiver capable of exchanging local telecommunication signals to a transceiver capable of exchanging positioning satellite signals,
a system of cartographic representation of buildings and of their interior architecture which associates with each position within a building a distribution of probability of acquisition of a satellite signal from a given direction,
means for determining a position of the mobile terminal by measuring a parameter of a signal from at least one access point of the local range telecommunication system, wherein the mobile terminal searches for location information and detects the at least one access point,
means for determining a probability of acquisition of signals from the various satellites, as a function of the azimuth and the elevation of various satellites of the satellite location system which can be perceived from the determined position of the mobile terminal, and as a function of a radio wave attenuation coefficient for the determined position of the mobile terminal known to the cartographic representation system,
means for searching for satellite signals from each perceived satellite for which the probability of reception exceeds a certain threshold, and
means for synchronizing the mobile terminal to acquired satellite signals.

4. A system according to claim 3, wherein the system of cartographic representation of buildings and their interior architecture is integrated into a location server using an Assisted-GPS or Assisted-GNSS location technique.

5. A method according to claim 1, wherein the cartographic representation system comprises a plurality of radio wave attenuation coefficients, each of which is associated with an element of the cartography of the building.

* * * * *